United States Patent Office 3,139,459
Patented June 30, 1964

3,139,459
PROCESS FOR THE ALKYLATION OF
DECABORANE
Raymond F. Bratton, Evans City, Pa., assignor to Callery
Chemical Company, Pittsburgh, Pa., a corporation of
Pennsylvania
No Drawing. Filed Mar. 6, 1961, Ser. No. 93,800
10 Claims. (Cl. 260—606.5)

This invention relates to compositions of high boron content comprising lower alkyl derivatives of decaborane, $B_{10}H_{14}$, and more particularly to an improved method for their production.

The alkylated higher boranes have found great utility as high energy fuels because of their high heat of combustion and other desirable chemical and physical properties, such as their stability, large liquidus range, low volatility and low viscosity. They can be burned readily with conventional oxidizers, such as, for example, air, oxygen, peroxides, nitric acid or nitric oxides and are particularly useful in thrust engines such as turbo-jets, ram-jets and rockets.

The heat of combustion, and therefore the realizable specific impulse, of the alkylated boron hydrides increases with an increase in the boron-carbon ratio of the compound. For example, monomethyldecaborane, with a boron-carbon ratio of 10 to 1, has a heat of combustion of about 27,200 B.t.u./lb., while tetramethyldecaborane, with a boron-carbon ratio of 10 to 4, has a heat of combustion of about 24,700 B.t.u./lb. For this reason, compositions comprising alkylated boron hydrides having high boron to carbon ratios are especially valuable as high energy fuels. Lower alkyl decaboranes in general, and mono(lower alkyl) and di(lower alkyl)decaboranes in particular, have the highest boron to carbon ratio of any known alkylated boron hydrides. Therefore, the chief object of this invention is to provide a method of producing compositions consisting essentially of mono-(lower alkyl)decaborane and di(lower alkyl)decaborane. Other objects will be shown in the following description and claims.

The method of alkylating decaborane by reacting a lower alkyl halide, such as methyl bromide, ethyl chloride or propyl bromide, with decaborane in the presence of a Lewis acid catalyst is known. Catalysts which are used include, for example, aluminum halides, gallium halides, ferric halides and boron trifluoride. The reaction can be carried out without a solvent or in excess alkyl halide, or by using an inert solvent, such as a saturated hydrocarbon. The products obtained, however, invariably contain appreciable amounts of trialkyldecaborane and tetraalkyldecaborane.

I have now found that carrying out the known alkylation method in a manner contrary to the ordinary and usually necessary practice unexpectedly provides a means of controlling the composition of the product.

The basis for this invention is my discovery that the alkylation of decaborane by the known reaction of a lower alkyl halide and decaborane in the presence of a Lewis acid catalyst is directed to produce substantially only monoalkyldecaborane by reacting less than about 15% of the decaborane, and is directed to produce a mixture consisting essentially of monoalkyldecaborane and dialkyl decaborane by reacting less than about 50% of the decaborane. In each case, the product obtained is substantially free of trialkyldecaborane, tetraalkyldecaborane and any other decaborane derivatives.

Since alkyl decaboranes can be separated from one another only with extreme difficulty, due to their similarity of properties, while unreacted decaborane is easily separated, this method provides an economical process for producing mono- and di-alkylated decaboranes free from higher derivatives; heretofore, these compounds were produced only as part of a mixture which could not be economically separated.

The control of the composition of the product provided by the method described herein is exemplified in Table I, which shows the composition of products obtained from reactions of methyl chloride and decaborane in pentane solvent using $AlCl_3$ as the catalyst.

Table I

| Percent $B_{10}H_{14}$ Reacted | Product | | |
|---|---|---|---|
| | Weight Percent Monomethyldecaborane | Weight Percent Dimethyldecaborane | Weight Percent Other Methyldecaboranes |
| 10 | 100 | | |
| 27 | 81 | 19 | |
| 35 | 77 | 23 | |
| 44 | 73 | 27 | |
| 53 | 62 | 30 | 8 |
| 69 | 50 | 38 | 12 |
| 77 | 38 | 34 | 29 |

As the above data illustrates, substantially no dimethyldecaborane is produced at decaborane conversions of less than about 15% and substantially no tri- or tetramethyldecaboranes are produced at conversions below about 50%. Similar results are obtained with other lower alkyl halides and decaborane.

The composition of the alkyl decaborane product is dependent only on the proportion of decaborane reacted, and is independent of processing variables, such as catalyst concentration, reactant concentrations, and temperature. Thus, for example, when the ratio of alkyl chloride to decaborane is changed there is substantially no change in the alkyl decaborane product, as is illustrated by Table II.

Table II

REACTION OF $CH_3Cl$ AND $B_{10}H_{14}$ IN PENTANE WITH $AlCl_3$ CATALYST

| Percent $B_{10}H_{14}$ Reacted | Mol Ratio of $CH_3Cl$ to $B_{10}H_{14}$ | Product | | |
|---|---|---|---|---|
| | | Weight Percent $CH_3B_{10}H_{14}$ | Weight Percent $(CH_3)_2B_{10}H_{12}$ | Weight Percent Other $(CH_3)_xB_{10}H_{14-x}$ |
| 44–45 | 6/1 | 74 | 24 | 2 |
| | 1/1 | 73 | 27 | |
| 51–53 | 6/1 | 62 | 30 | 8 |
| | 1/1 | 64 | 30 | 6 |
| 77–82 | 6/1 | 38 | 34 | 28 |
| | 3/1 | 34 | 38 | 28 |

Similarly, changes in the proportion of catalyst or in the temperature used do not appreciably change the product distribution.

The processing variables do, however, affect the time required to each any selected percentage of decaborane reacted, i.e. they affect the overall rate of reaction. The rate of reaction is increased with increasing reactant concentration, catalyst concentration, and temperature. Thus, for example, it requires 4 hours to react 44% of the decaborane, using $AlCl_3$ catalyst and pentane solvent at 50° C. and a mol ratio of $CH_3Cl$ to $B_{10}H_4$ of 1:1; it requires only ½ hour at the same conditions to react 45% of the decaborane when using a $CH_3Cl$ to $B_{10}H_{14}$ ratio of 6:1. The reaction time for any particular set of conditions is easily determined by analysis of the product to determine the amount of decaborane reacted.

The reaction may be terminated at the desired point by a variety of methods. The reactants may be separated by extraction or vaporization of the alkyl halide. Thus, for example, when the reaction is performed using methyl chloride as both solvent and reactant it must be performed under pressure to maintain the methyl chloride in the liquid phase. The reaction in such cases is generally stopped simply by venting the reactor, thereby reducing the pressure, and vaporizing and removing the methyl chloride. The reaction is also essentially terminated by cooling the reactant mixture to low temperatures, e.g., −20° C., and separating the reactants and products at the low temperature, as by fractional crystallization, vacuum distillation or extraction.

The reaction may be most conveniently terminated by destruction of the catalyst. This is accomplished by adding sufficient water or other hydroxyl-containing reagent to react with the catalyst. The aqueous solution of catalyst-water reaction products is immiscible with other reaction mixtures and is conveniently separated by decantation or similar methods.

Unreacted decaborane and the product alkyl decaboranes are easily separated by conventional techniques, such as distillation, extraction, fractional crystallization, and the like. When a hydrocarbon solvent is used, separation is conveniently achieved by cooling the mixture of hydrocarbon, alkyl decaborane and decaborane to crystallize decaborane (−78° C., for example, is a convenient and satisfactory temperature) and filtering; the resultant filtrate contains hydrocarbon and the alkyl decaborane product. The hydrocarbon is then easily removed by distillation, stripping or other separation methods utilizing the wide difference in volatility between the liquid hydrocarbons and the alkyl decaborane. Although similar crystallization procedures may be used when excess alkyl halide is used as a reaction solvent, without adding hydrocarbon, it is preferred to change to a hydrocarbon solvent for the crystallization step. Thus, for instance, when a reaction mixture of ethyl chloride, decaborane, and ethyldecaborane is contacted with a hydrocarbon the ethyl chloride is vaporized and a solvent exchange is effected. Separation is then carried out as above.

It may be noted that when the product mixture is to be used as a fuel, all the decaborane need not always be separated from the product, since solutions of decaborane in alkyl decaborane are usable as fuels in the same manner as the alkyl decaboranes above.

In the foregoing description, the method and practice of the invention has been chiefly exemplified by reference to the methyl decaboranes as produced by reacting a methyl halide with decaborane. The methyl decaboranes have the highest boron to carbon ratios and the highest heats of combustion of any of the alkyl decaboranes, and thus are preferred for use as fuels and for similar applications wherein such properties are important. However, it should be recognized that the invention is also applicable to other lower alkyl decaboranes in the same manner. Thus, for example, the product distribution of ethyl decaboranes produced from an ethyl halide and decaborane using a Lewis acid catalyst is similarly controlled by limiting the proportion of decaborane converted; substantially only monoethyldecaborane is produced at conversions below about 15% and substantially only monoethyldecaborane and diethyldecaborane are obtained at conversions below about 50%.

According to the provisions of the patent statutes, I have explained the principle and mode of practicing my invention, and have described what I now consider to be its best embodiments. However, I desire to have it understood that within the scope of the appended claims, the invention may be practiced otherwise than as specifically described.

I claim:
1. A method of producing a composition consisting essentially of mono(lower alkyl)decaborane and di(lower alkyl)decaborane which comprises the steps of reacting decaborane with a (lower alkyl) halide having a molar ratio of said halide to decaborane of at least 1 to 1 in the presence of a Lewis acid catalyst selected from the group consisting of aluminum halides, gallium halides, ferric halides and boron trifluoride, terminating the said reaction while less than about 50% of the decaborane has reacted, and recovering the composition produced thereby.

2. A method according to claim 1 in which the catalyst is $AlCl_3$.

3. A method according to claim 1 in which the lower alkyl halide is a methyl halide.

4. A method according to claim 1 in which the alkyl halide is an ethyl halide.

5. A method of producing a composition consisting essentially of mono(lower alkyl)decaborane which comprises reacting decaborane with a lower alkyl halide having a molar ratio of said halide to decaborane of at least 1 to 1 in the presence of a Lewis acid catalyst selected from the group consisting of aluminum halides, gallium halides, ferric halides and boron trifluoride, terminating the said reaction while less than about 15% of the decaborane has reacted, and recovering the composition produced thereby.

6. A method according to claim 5 in which the catalyst is $AlCl_3$.

7. A method according to claim 5 in which the lower alkyl halide is a methyl halide.

8. A method according to claim 5 in which the lower alkyl halide is an ethyl halide.

9. A method according to claim 5 in which the reactants are contacted in an inert solvent.

10. A method according to claim 9 in which the solvent is a saturated hydrocarbon.

References Cited in the file of this patent

UNITED STATES PATENTS 2,999,117    Altwicker et al. _____ Sept. 5, 1961